US005156226A

United States Patent [19]

Boyer et al.

[11] Patent Number: 5,156,226

[45] Date of Patent: Oct. 20, 1992

[54] MODULAR POWER DRIVE WHEELCHAIR

[75] Inventors: Ronald G. Boyer, Camrillo; James J. Michel, Agoura; Bert J. Goletski, Sepulveda, all of Calif.

[73] Assignee: Everest & Jennings, Inc., Camarillo, Calif.

[21] Appl. No.: 554,363

[22] Filed: Jul. 19, 1990

Related U.S. Application Data

[62] Division of Ser. No. 253,508, Oct. 5, 1988, Pat. No. 4,967,864.

[51] Int. Cl.[5] ......................... B62M 1/14; A61G 5/04

[52] U.S. Cl. .................................. 180/65.1; 180/907; 280/250.1; 297/443; 297/DIG. 4

[58] Field of Search ................ 403/161, 163; 180/907, 180/65.1; 280/250.1, 304.1; 297/443, DIG. 4

[56] References Cited

U.S. PATENT DOCUMENTS

| | | | |
|---|---|---|---|
| 3,111,334 | 11/1963 | Krizman | 403/161 X |
| 3,749,192 | 7/1973 | Karchak, Jr. | 180/907 X |
| 3,896,891 | 7/1975 | Miltenburg et al. | 180/907 X |
| 3,945,449 | 3/1976 | Ostrow | 180/907 X |
| 4,360,213 | 11/1982 | Rudwick et al. | 280/250.1 |
| 4,383,793 | 5/1983 | Weir | 403/161 X |
| 4,459,061 | 7/1984 | Klement | 403/163 |
| 4,766,980 | 8/1988 | Engle | 403/161 X |

FOREIGN PATENT DOCUMENTS

| | | | |
|---|---|---|---|
| 2148805 | 6/1985 | United Kingdom | 280/250.1 |

*Primary Examiner*—Andres Kashnikow
*Assistant Examiner*—Michael Mar
*Attorney, Agent, or Firm*—Kelly, Bauersfeld & Lowry

[57] ABSTRACT

A modular power drive wheelchair is provided for rapid assembly and/or disassembly of relatively compact modular components. The wheelchair comprises a base module including a base frame and related support wheels, wherein the base frame is adapted for facilitated mounting or dismounting of a seat module. A battery module including at least one storage battery is provided for relatively easy slide fit mounting onto the base frame at a position below the seat module. A controller module is also provided for mounting onto the base module and functions during wheelchair operation to control battery powered operation of one or more drive motors coupled to the wheelchair wheels. The various modules are designed for rapid disassembly to permit easy transporting of the wheelchair, for example, within the trunk of a standard automobile. Moreover, the base and seat modules are designed for relatively easy size adjustment to accommodate changing size requirements, for example, of a growing child.

6 Claims, 7 Drawing Sheets

FIG. 1
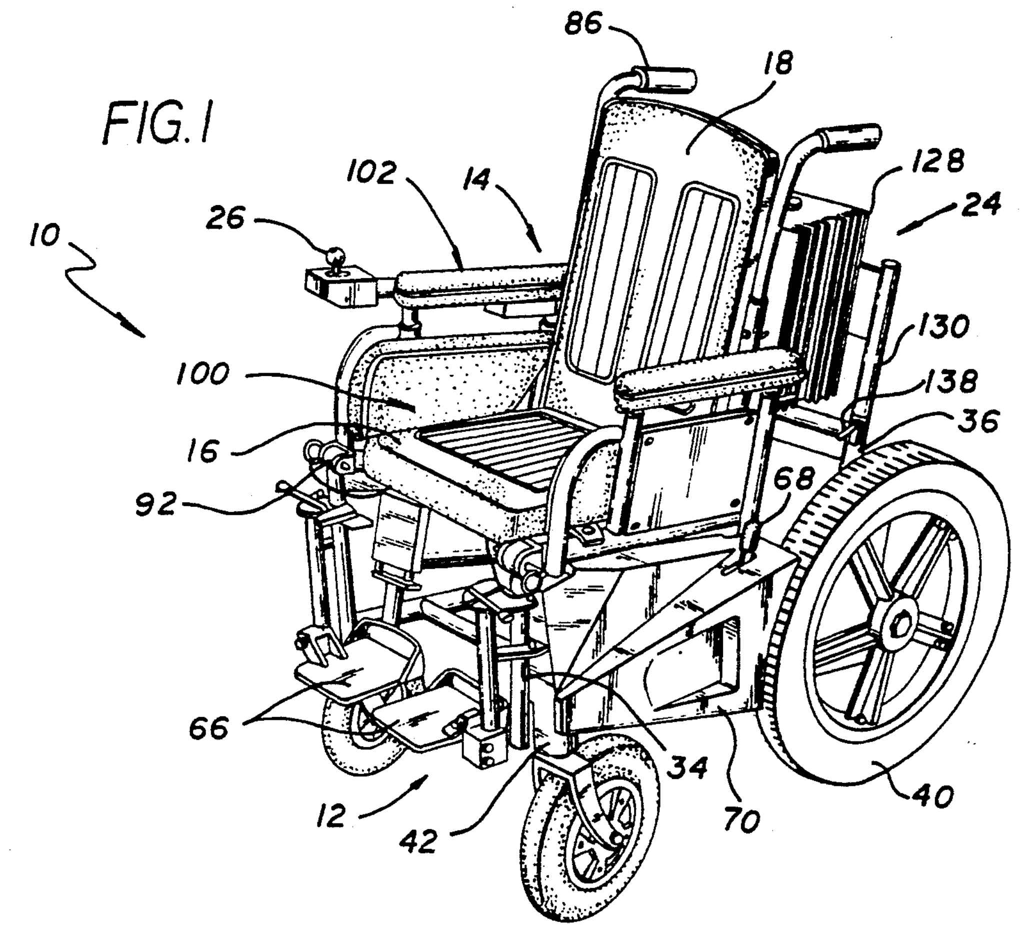
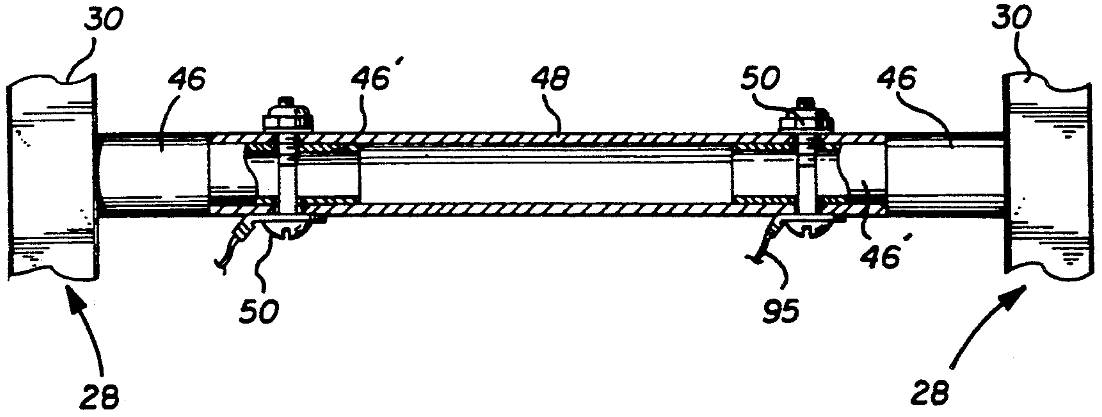
FIG. 3

FIG. 4
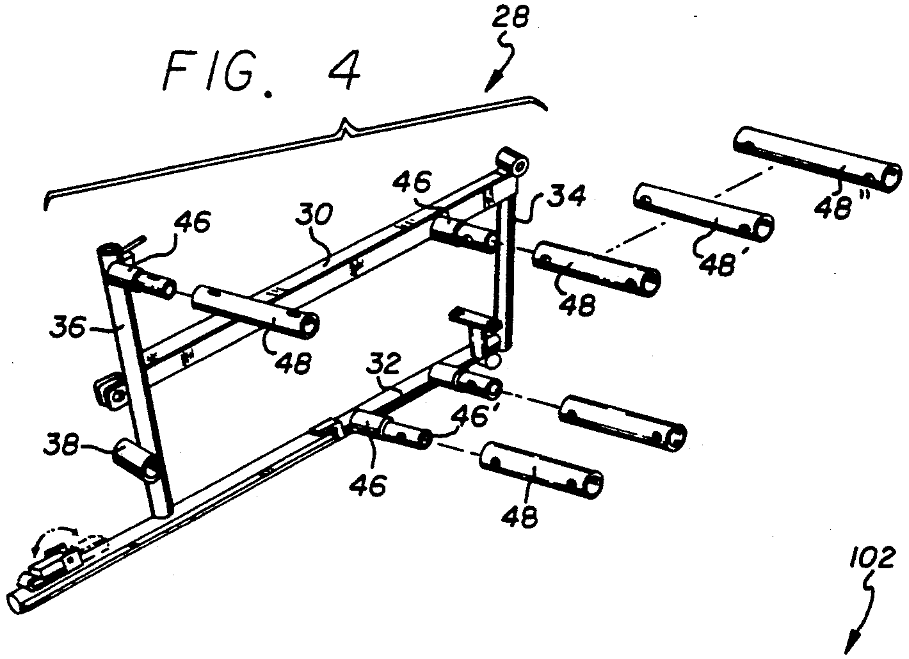
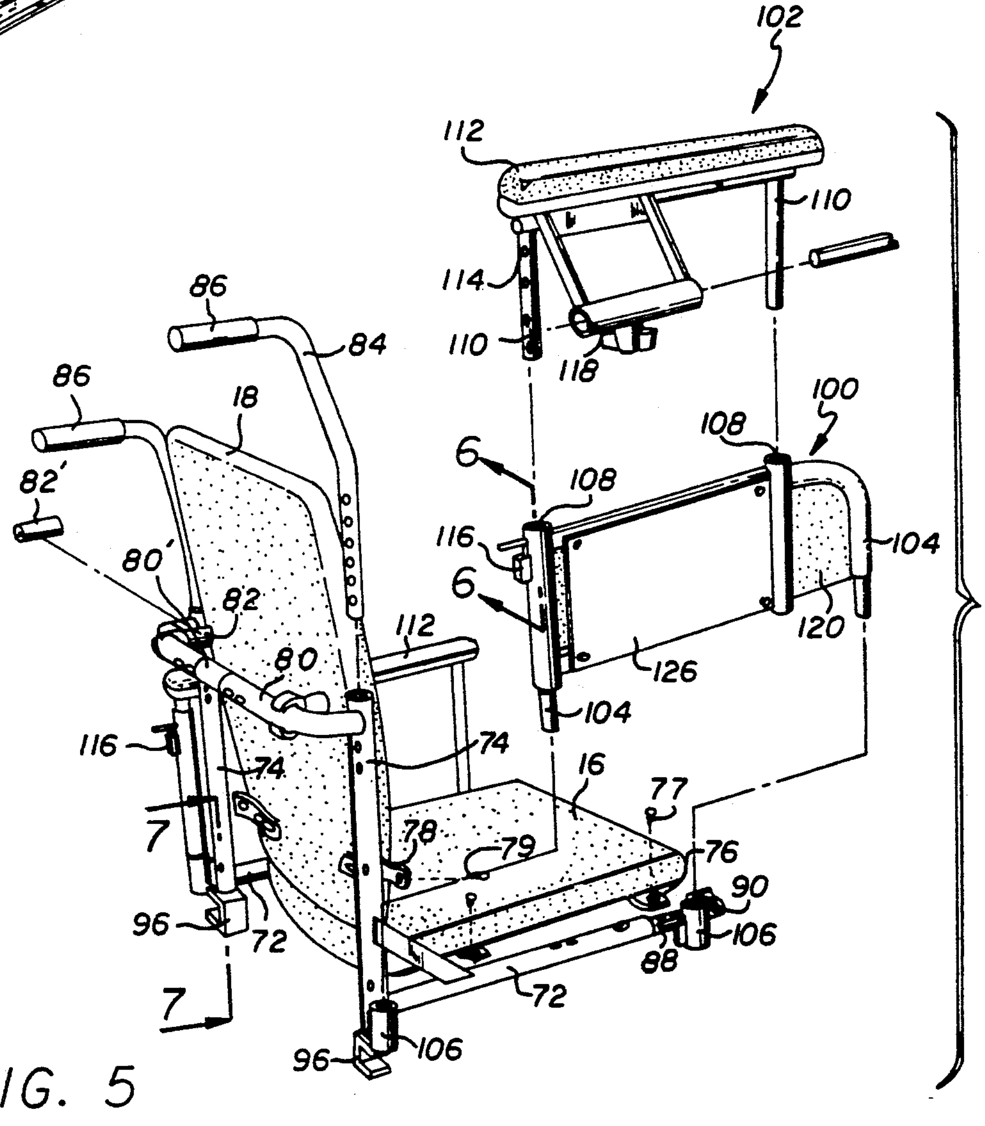
FIG. 5

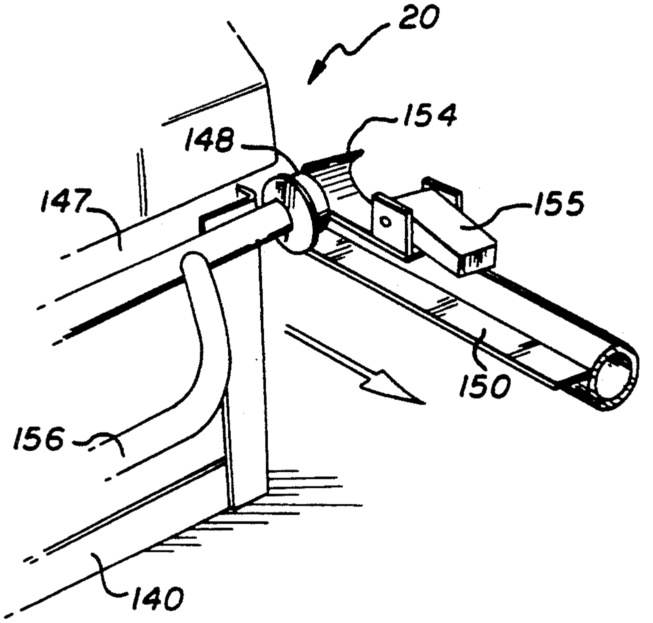
FIG. 12
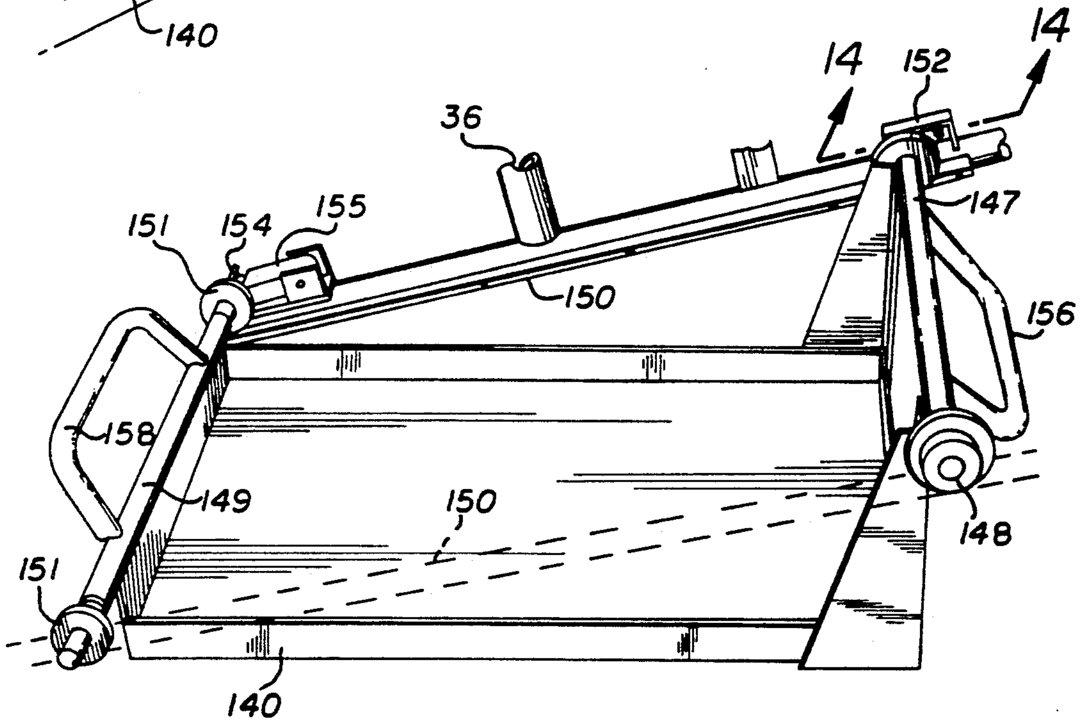
FIG. 13
FIG. 14
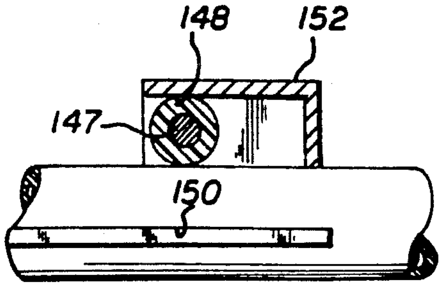

MODULAR POWER DRIVE WHEELCHAIR

This is a division of application Ser. No. 07/253,508, filed Oct. 5, 1988, now U.S. Pat. No. 4,967,864.

BACKGROUND OF THE INVENTION

This invention relates generally to power drive wheelchairs of the type having on-board drive means for rotatably driving the wheelchair wheels. More particularly, this invention relates to an improved power drive wheelchair constructed from modular components or subassemblies to permit wheelchair disassembly into a small number of compact modules adapted for easy transport and/or storage.

Power drive wheelchairs in general are known in the art to provide motorized mobility to persons confined to a wheelchair. Such power drive wheelchairs conventionally comprise a relatively sturdy wheelchair frame supported on wheels for rolling movement, in combination with one or more batteries for supplying electrical power to an associated drive motor or motors coupled to the wheelchair wheels. An electronic controller unit is also carried by the wheelchair to regulate power driven operation of the drive motor or motors, typically in accordance with positioning of a joystick type control mechanism or the like located in close proximity to a wheelchair seat. In many modern power drive wheelchairs, the controller unit utilizes pulse width modulation techniques to regulate a pair of drive motors in a manner permitting simple joystick selection of wheelchair drive direction and speed. For one example of a power drive wheelchair of this general type, see U.S. Pat. No. 4,549,624.

Although power drive wheelchairs of the general type described above are capable of providing great improvements in overall mobility and independence to wheelchair patients, the necessary drive components have resulted in relatively heavy and costly wheelchair constructions. More specifically, the requisite power storage batteries and related drive motors and control components result in a relatively heavy wheelchair construction having a gross weight commonly in excess of one hundred pounds. This relatively heavy chair weight has required a correspondingly heavy duty wheelchair frame designed to support the drive components and the wheelchair patient without significant mechanical instability or risk of mechanical failure. As a result, power drive wheelchairs have used relatively heavy rigid frames having low centers of gravity to insure reliable and safe operation. However, such configurations are not designed for easy handling or for disassembly or folding into a compact shape for easy transport in a standard passenger automobile or the like. Instead, vehicle transport of a power drive wheelchair has normally been limited to the use of vans or trucks or other specialized vehicles having, for example, power lift mechanisms for loading and unloading the heavy wheelchair from the vehicle. Moreover, the rigid frame requirements for power drive wheelchairs have generally precluded significant size adjustment capabilities as may be desired, for example, in a wheelchair used by a growing child or adolescent. Instead, to meet changing size requirements, it has been necessary to acquire a different wheelchair.

There exists, therefore, a significant need for an improved power drive wheelchair designed for rapid assembly and disassembly of modular components to accommodate facilitated transport in a standard passenger automobile or the like. Moreover, there exists a need for a power drive wheelchair adapted for a range of size adjustments to meet changing size requirements of a wheelchair patient. The present invention fulfills these needs and provides further related advantages.

SUMMARY OF THE INVENTION

In accordance with the invention, an improved power drive wheelchair is constructed from a relatively small number of modular components or subassemblies adapted for rapid and easy assembly and/or disassembly. In the assembled configuration, the modular components cooperatively define a sturdy wheelchair construction adapted for conventional power drive wheelchair operation utilizing, for example, a joystick control mechanism operated by a person sitting in the wheelchair. However, in the disassembled state, the individual modular components have a generally lightweight construction adapted for relatively easy lifting and handling, and for transport within a compact volumetric space, such as within the trunk of a standard passenger automobile or the like. Moreover, in the disassembled state, the modular components accommodate a range of size adjustments to permit the wheelchair geometry to be altered in accordance with changing size requirements of a wheelchair patient.

In the preferred form of the invention, the improved power drive wheelchair comprises a base module including a base frame supported for rolling movement by a plurality of wheelchair wheels. A pair of the wheelchair wheels at opposite sides of the base frame are coupled through releasable clutch units to individual drive motors adapted to power drive the wheels when the clutch units are engaged. A seat module is provided for quick release mounting and dismounting onto the base frame, and includes a seat and seatback for supporting a wheelchair patient. A controller module is also adapted for quick release mounting onto the base frame, wherein the controller module includes means for regulating power drive operation of the drive motors in accordance with the position of a movable control member such as a joystick controller on the seat module. Power for the drive motors is provided by one or more storage batteries of a battery module adapted for removable slide fit mounting onto the base frame at a position beneath the wheelchair seat.

In accordance with one primary aspect of the invention, the various modules are quickly and easily disassembled to provide relatively compact and lightweight components adapted for relatively easy lifting, handling, transport and storage. These modules are also adapted for rapid re-assembly to provide a sturdy power drive wheelchair construction. When disassembled, the base and seat modules are designed for size adjustment such as width and/or depth to meet the variable size requirements of a wheelchair patient.

In accordance with further primary aspects of the invention, the battery module is designed for simple installation and removal with respect to the base module without requiring direct or awkward lifting of the relatively heavy storage batteries. More particularly, the storage batteries are supported on a battery tray which includes cam rollers at opposite sides thereof for rolling engagement with inclined cam ramps on the base frame. Lock means are provided for normally locking the battery tray in place on the base frame during normal wheelchair operation. However, the battery module is easily removed from the base module by unlocking the tray and sliding the tray outwardly from the base frame with the cam rollers guiding along the cam ramps. The cam ramps are oriented such that the battery tray is displaced rearwardly and downwardly along the ramps to a position resting directly upon the floor behind the base frame. In this position, the battery module is lifted easily without any need to reach into or beneath other components of the wheelchair. Re-installation of the battery module is achieved by placing the tray on the floor behind the base frame and pushing the tray into the base frame with the cam rollers guiding upwardly along the inclined cam ramps.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a modular power drive wheelchair embodying the novel features of the invention;

FIG. 3 is an enlarged horizontal sectional view taken generally on the line 3—3 of FIG. 2;

FIG. 4 is an exploded perspective view illustrating assembly and adjustment capability for a base module for the power drive wheelchair;

FIG. 5 is an exploded perspective view illustrating assembly and adjustment capability for a seat module for the power drive wheelchair;

FIG. 12 is an enlarged fragmented perspective view showing battery module installation onto the base module of the wheelchair;

FIG. 13 is an enlarged fragmented perspective view depicting a battery tray of the battery module in a position installed onto the base module;

FIG. 14 is an enlarged fragmented vertical sectional view taken, generally on the line 14—14 of FIG. 13.

DETAILED DESCRIPTION OF THE PREFERRED EMBODIMENT

Figure 2:
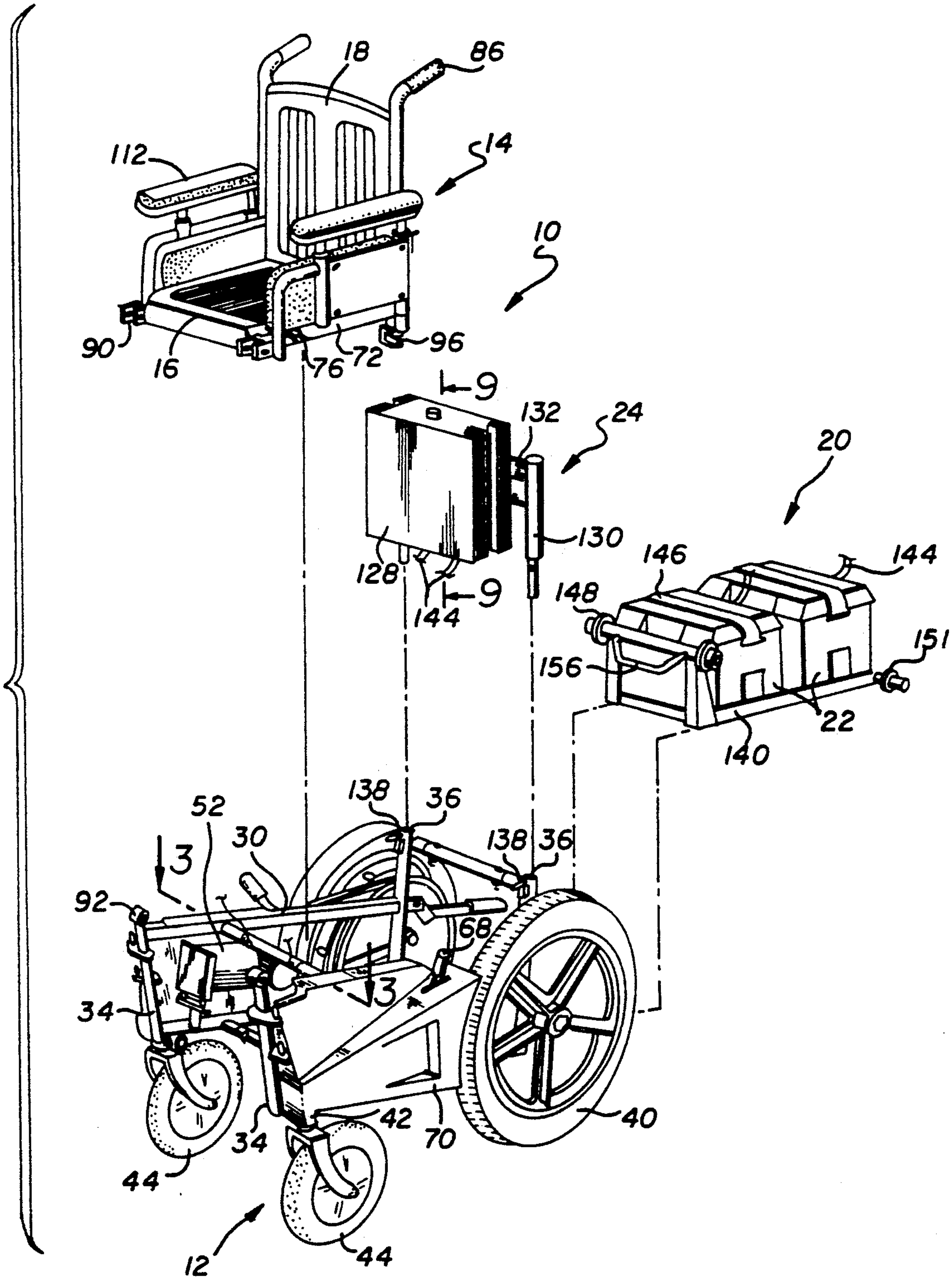
FIG. 2 is an exploded perspective view of the modular power drive wheelchair of the FIG. 1.

As shown in the exemplary drawings, an improved power drive wheelchair referred to generally in FIGS. 1 and 2 by the reference numeral 10 is constructed from a relatively small number of compact modular components adapted for relatively easy assembly and disassembly. These modular components, shown in exploded relation in FIG. 2, are individually sized and shaped for facilitated handling to permit easy transport and/or storage of the wheelchair 10 in the disassembled state. Moreover, these modular components are designed for rapid assembly to provide a structurally rigid power drive wheelchair (FIG. 1) adapted for reliable operation with a prolonged service life.

The improved power drive wheelchair 10 of the present invention advantageously permits the wheelchair to be quickly and easily disassembled in part to accommodate wheelchair transport in a standard passenger automobile or the like. More specifically, in the past, power drive wheelchairs have generally been constructed from relatively heavy rigid frames designed to support the wheelchair patient together with the requisite power drive components such as drive motors and transmission, and related storage batteries for supplying electrical power to the drive motors. Such prior wheelchair constructions have not been designed for folding or partial disassembly to a compact profile for easy vehicular transport. Instead a specialized vehicle (such as a van or the like has been required for transporting a power drive wheelchair. Moreover, the size and weight of power drive wheelchairs has generally required such vehicles to be equipped with costly power lift mechanisms to load and unload the wheelchairs from the vehicle. All of these requirements unfortunately combine to increase the overall cost of power drive wheelchair use and operation to a level which can be prohibitive to many wheelchair patents.

The modular power drive wheelchair of the present invention is specifically designed for rapid partial disassembly into compact modular components whenever it is desired to transport the wheelchair in a vehicle from one place to another. The modular wheelchair components are individually sized and shaped to permit relatively easy handling and lifting by an average person. Moreover, the modular components are sized to fit within a compact storage volume such as within the trunk of a typical passenger automobile. For example, in a preferred form, the individual modules of the wheelchair are all sized to fit within a standard trunk space having a height limit of as small as seventeen inches.

Figure 11:
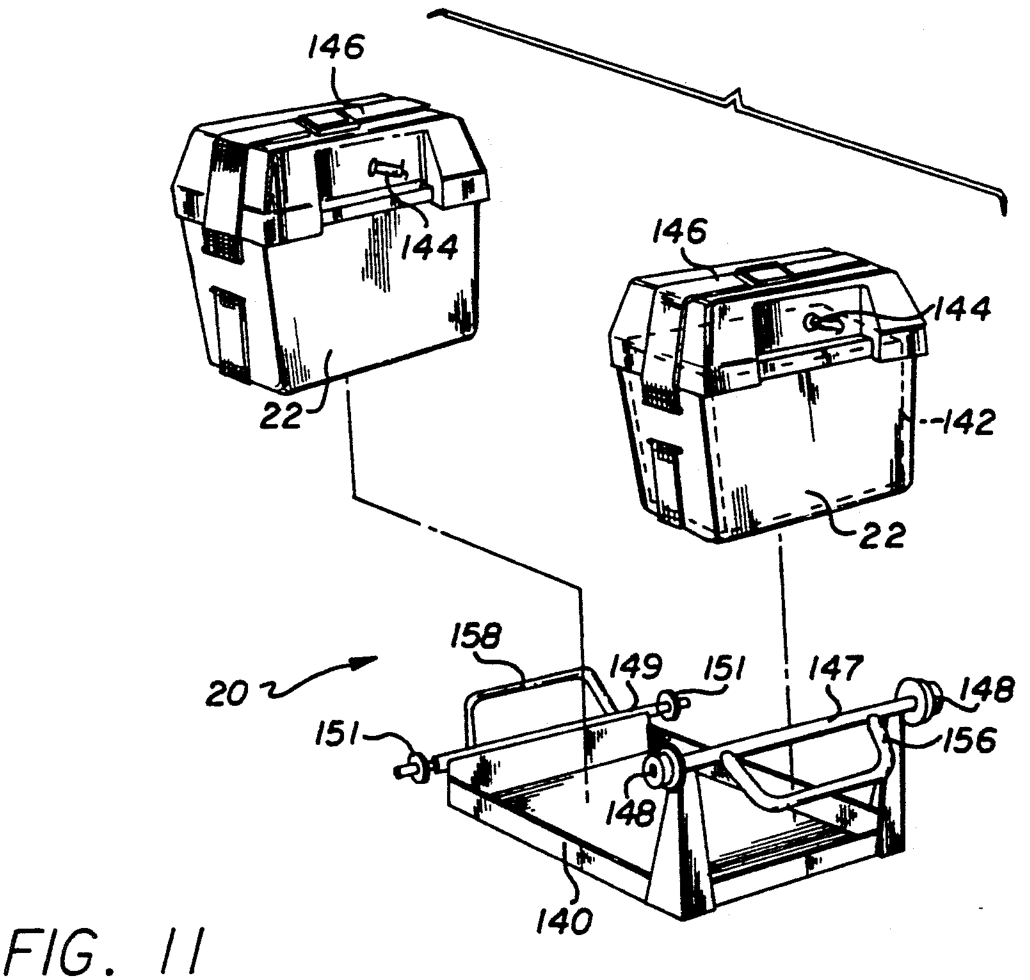
FIG. 11 is an enlarged exploded perspective view illustrating a battery module for the wheelchair.

In general terms, as viewed in FIGS. 1 and 2, the modular power drive wheelchair 10 comprises a base module 12 defined by a relatively compact rigid base frame supported for rolling movement by a plurality of wheels. The base module 12 is designed for removable mounting of a seat module 14 including a wheelchair seat 16 and an associated seatback 18 for supporting a wheelchair patent (not shown). A battery module 20 (FIGS. 2 and 11) is also removably mounted on the base module and includes one or more electrical storage batteries within closed containers 22 or the like for power driving of the wheelchair wheels. A controller module 24 is adapted for removable mounting onto the base module 12 at a position behind the seat module 14 for regulating power driving of the wheels in accordance with the position of a control device such as a joystick 26 (FIG. 1) or the like mounted on the seat module 16.

More specifically, as shown in more detail in FIGS. 2–4, the illustrative base module 12 comprises the base frame defined by a pair of side frames 28 constructed from metal tubing components or the like. As viewed in FIG. 4, each side frame 28 comprises upper and lower rails 30 and 32 connected between front and rear upright support posts 34 and 36 to provide a rigid, generally rectangular geometry. The upper rail 30 has a generally rectangular cross sectional shape, in the preferred form, for facilitated stable yet removable support of the seat module 14, as will be described. A wheel socket 38 is carried by the rear support post 36 for suitable mounting of a rear drive wheel 40 (FIGS. 1 and 2) for the wheelchair. A caster socket 42 (FIGS. 1 and 2) is mounted at or near the lower end of the front support post 34 for mounting of a swivel type front caster wheel 44.

The two side frames 28 for the wheelchair include a plurality of support tubes 46 projecting in laterally inboard direction for use in securely interconnecting the side frames. These support tubes 46 are shown in detail in FIGS. 3 and 4, with four of said support tubes 46 being shown. The support tubes 46 are rigidly attached at spaced locations to the associated side frame 28, as by welding the like, and project for short distances in inboard directions before terminating in terminal ends 46' of necked down or reduced diametric size. These terminal ends 46' of the support tubes are sized for close fit sliding reception into the open ends of spacer tubes 48 extending transversely between the side frames. Fasteners such as screws 50 (FIG. 3) are passed through the interfitting support tubes 46 and spacer tubes 48 for securely attaching the components together. Importantly, however, in accordance with one aspect of the invention, the use of the spacer tubes 48 to rigidly interconnect the side frames 28 permits the width of the base module 12 to be altered by appropriate selection of the lengths of the spacer tubes. That is, with reference to FIG. 4, alternate spacer tubes 48' or 48" can be provided for connection between the side frames 28 to yield a different base module width. These alternate spacer tubes can thus be used to customize wheelchair width according to the needs of a specific patient, or to alter wheelchair width to accommodate a growing child or the like without requiring acquisition of an entirely new power drive wheelchair.

Figure 15:
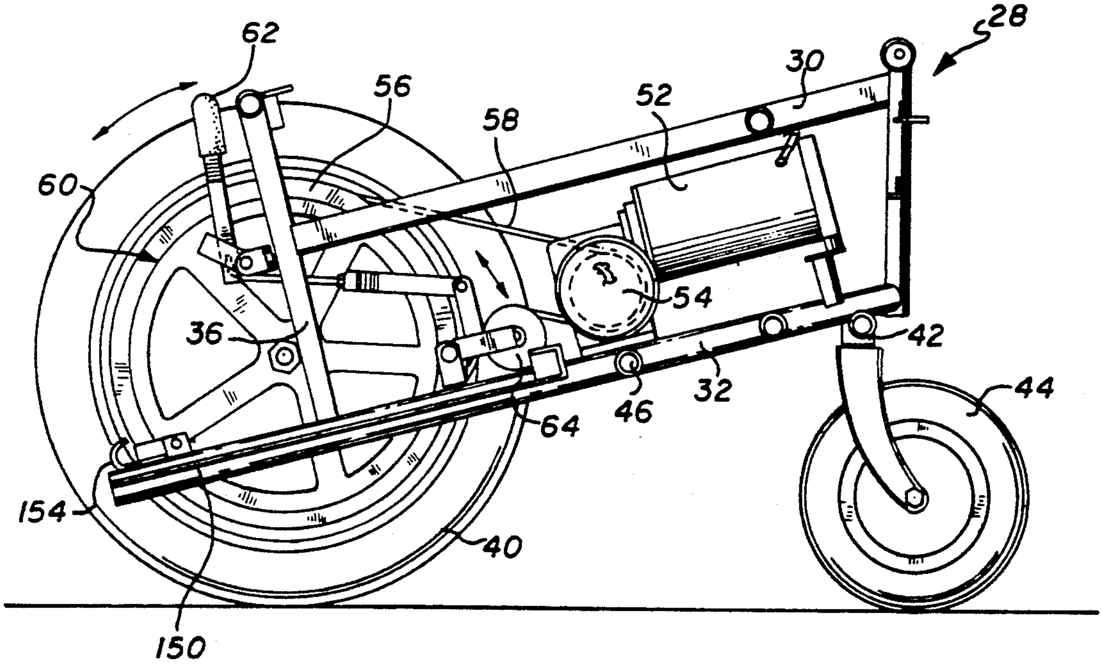
FIG. 15 is a longitudinal vertical sectional view of the base module, depicting a drive motor and related clutch unit.

The base module 12 of the power drive wheelchair further includes drive components for power drive operation of the wheelchair wheels 40. More specifically, as generally known in the art, the side frames 28 respectively support a pair of drive motors 52 (FIGS. 2 and 15) at the inboard sides thereof. These drive motors 52 are adapted for electrical connection to the controller module 24, which is coupled in turn to the battery module 20. The controller module 24 appropriately regulates the supply of power to the drive motors 52 in a manner controlling wheelchair speed and direction of movement, typically through the use of the joystick 26 (FIG. 1) and pulse width modulation techniques known to those skilled in the art. The drive motors 52 are respectively associated with the two rear drive wheels 40 for the wheelchair, and are drivingly coupled to the associated wheel 40 via drive and driven pulleys 54 and 56 (FIG. 15) interconnected by a drive belt 58. A releasable clutch unit 60 is normally provided with each drive belt 58 and includes a manual lever 62 movable between over-center positions to displace a clutch pulley 64 into or out of engagement with the drive belt 58. When the clutch unit 50 is engaged, as viewed in FIG. 15, the drive belt 58 transmits rotary motion from the drive pulley 54 to the rear wheel 40. However, when the clutch unit 60 is disengaged, the drive belt 58 is sufficiently loosened to prevent drive transmission to the rear wheel 40. In this disengaged condition, the wheelchair can be moved about by manual pushing or the like.

Additional components on the base module 12 are provided to enhance and/or facilitate wheelchair use. For example, footrest units 66 (FIG. 1) of the general type described in U.S. Pat. No. 4,176,879 may be suspended from the front support posts 34 of the side frames 28 to support the legs and feet of a wheelchair patient. These footrest units may be adjusted to swing laterally outwardly to out-of-the-way positions, as known in the art, for facilitated ingress and egress relative to the wheelchair seat 16. Manually operated brake units 68 (FIGS. 1 and 2) of the type described, for example, in pending Ser. No. 007,929, now U.S. Pat. No. 4,786,797, may also be provided for releasably locking the rear wheels 40 against rotation. Moreover, as shown in FIGS. 1 and 2, the sides frames 28 provide a convenient support substrate for shaped cowlings 70 mounted on the outboard sides of the side frames. These cowlings 70 are configured to represent the appearance of a racecar or the like and thereby provide the power drive wheelchair with a novelty aspect popular with children and/or adolescents.

Figure 6:
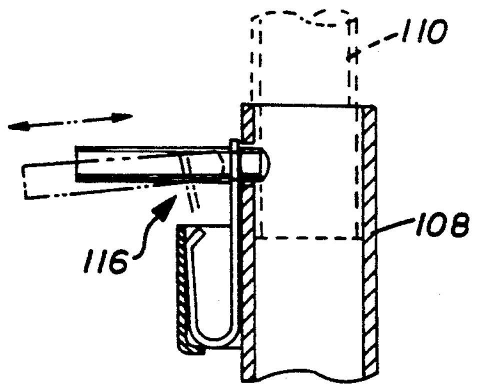
FIG. 6 is an enlarged fragmented vertical sectional view taken generally on the line 6—6 of FIG. 5.

The seat module 14 is designed for rapid mounting onto and quick release dismounting from the base module 12. As shown in detail in FIGS. 5–7, the illustrative seat module 14 comprises a variable size seat frame adapted to support the seat 16 and the seatback 18. More specifically, the seat frame comprises a pair of seat rails 72 rigidly connected at their rear ends to a corresponding pair of generally upright seatback posts 74. The wheelchair seat 1 includes mounting brackets 76 at the opposite sides thereof for connection by means of suitable fasteners 77 to the seat rails 72. Similarly, the seatback 18 includes appropriate mounting brackets 78 for connection via suitable fasteners 79 to the seatback posts 74. Additionally, the seatback posts 74 are rigidly interconnected near their upper ends by a support tube brace 80 extending transversely between the posts 74 in spaced relation from a rear face of the seatback 18. Spacer sleeves 82 extend between the rear face of the seatback 18 and the brace 80 for selectively controlling the fore-aft positioning of the seatback 18, with sleeves 82' of alternative lengths (FIG. 5) being provided to accommodate different patient requirements. Moreover, the widths of the seat 16 and the seatback 18 can be chosen and/or changed with appropriate replacement components to meet patient requirements. For varying width requirements, the support tube brace 80 is provided in tubular sections similar to the spacer tubes 48 of the base module to permit insertion at a central brace tube 80' having a width chosen according to patient requirements. The seat and seatback widths are, of course, correlated with the width geometry for the base module. Telescoping seatback extension posts 84 are normally received into the upright posts 74 and releasably locked at selected vertical positions of adjustment to orient rearwardly turned push handles 86 at desired elevational positions.

The forward ends of the seat rails 72 telescopically receive a pair of rail extensions 88 each having a generally U-shaped clevis 90 at the forward end thereof. These rail extensions 88 permit a seat 16 of a range of different fore-aft depth dimensions to be installed onto the seat frame. When the associated seat mounting brackets 78 are secured to the side rails 72 and telescopic extensions 88, the rail extensions are locked against displacement relative to the side rails.

Figure 10:
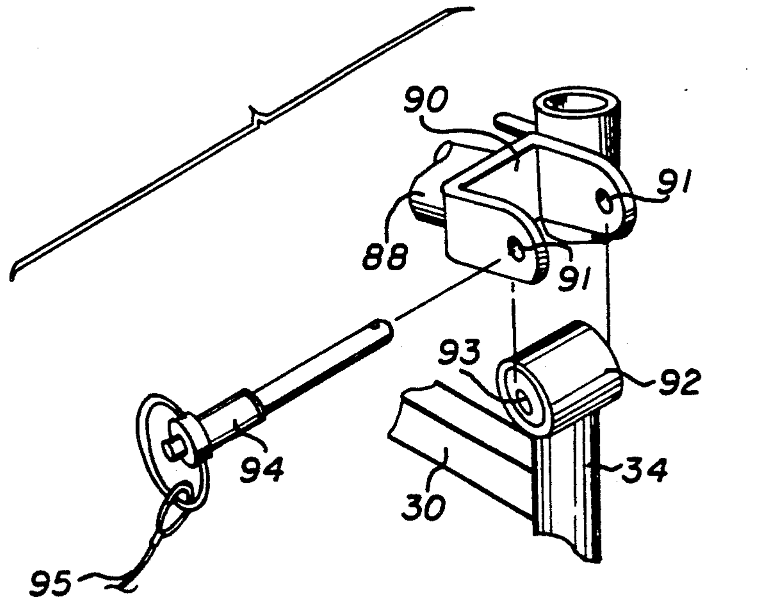
FIG. 10 is an enlarged exploded perspective view illustrating a quick release connection between the base and seat modules of the wheelchair.

The U-shaped clevises 90 at the front sides of the seat frame are oriented for quick release attachment to and/or disconnection from the base module 12. More particularly, as viewed in FIGS. 2 and 10, the front support posts 34 of the seat frame carry support bushings 92 at their upper ends, wherein these bushings 92 are sized for relatively close sliding fit into the open clevises 90 of the seat frame. Quick release pins 94 (FIG. 10) of the pushbutton type described in U.S. Pat. No. 4,351,540 are provided for locking reception through aligned ports 91 in the clevis arms and a bushing bore 93 to lock the seat frame onto the base frame. These quick release pins 94 are adapted for simple disengagement from the associated clevis 90 and support bushing 92 to permit component disassembly, as will be described. Conveniently, to prevent loss of the quick release pins 94 when the components are disassembled, retention cables 95 are provided to attach the pins 94 to the base module 12, for example, as by attachment to the fasteners 50 at the forwardmost spacer tube 48, as viewed in FIG. 3.

Figure 7:
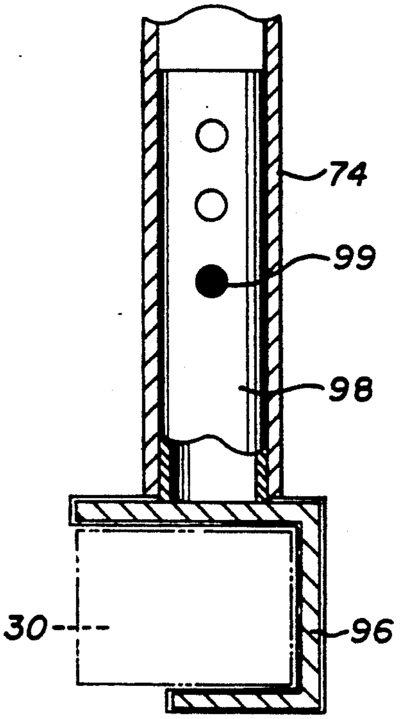
FIG. 7 is an enlarged fragmented vertical sectional view taken generally on the line 7—7 of FIG. 5.

When the clevises 90 at the front of the seat module 14 are secured to the associated support bushings 92, the rear of the seat module 14 is locked onto the base module 12 by means of a pair of anchor feet 96 at the lower ends of the seatback posts 74. These anchor feet 96, as shown in FIGS. 5 and 7, comprise generally U-shaped brackets attached as by welding or the like onto mounting sleeves 98 which project upwardly into the lower ends of the seatback posts 74. Lock pins 99 releasably retain the mounting sleeves 98 in a selected vertical position telescoped into the seatback posts 74, such that the seat module angle about a pivot axis defined by the clevises 90 can be chosen by varying the heights of the anchor feet 96. As shown in FIG. 7, these anchor feet 96 have a generally U-shaped configuration to open in outboard directions and to lock securely onto the upper rails 30 of the base module 12. The illustrative drawings show mating rectangular shapes for these components, although other types of mating geometries can be used.

The seat module 14 is thus mounted quickly and easily onto the base module 12 by rotating or twisting the lower rear end of the seat module sufficiently to move the anchor feet 96 into locking registry with the upper rails 30 at the inboard sides of the rails 30. In this position, the anchor feet 96 are then slidable along the rails 30 in the fore-aft direction to align the clevises 90 with the associated support bushings 92. Insertion of the quick release pins 94 functions to lock the seat and base modules together. Conversely, withdrawal of the pins 94 permits quick and easy removal of the seat module 14 from the base module 12 in a reverse sequence.

As shown in FIG. 5, the seat frame further includes a side panel unit 100 which in turn supports a vertically adjustable armrest unit 102. Two side panel units are conveniently provided at the opposite sides of the seat 16, such as by reception of vertically oriented panel tubes 104 into vertically oriented support sleeves 106 on the seat frame. Each side panel unit 100 provides an appropriate side enclosure structure at the side of the wheelchair seat. Upwardly open sockets 108 on the side panel unit in turn receive support posts 110 of the armrest unit 102, wherein these support posts 110 have their upper ends interconnected by a cushioned armrest 112. At least one of the armrest support posts 110 includes vertically spaced apertures 114 (FIG. 5) for receiving a spring-load latch pin 116 (FIG. 6) to releasably lock the armrest unit at the desired elevational position. A joystick bracket 118 is carried by one of the armrest units 102 for supporting the joystick 26 in a convenient position for operational access by a person sitting in the wheelchair.

Figure 8:
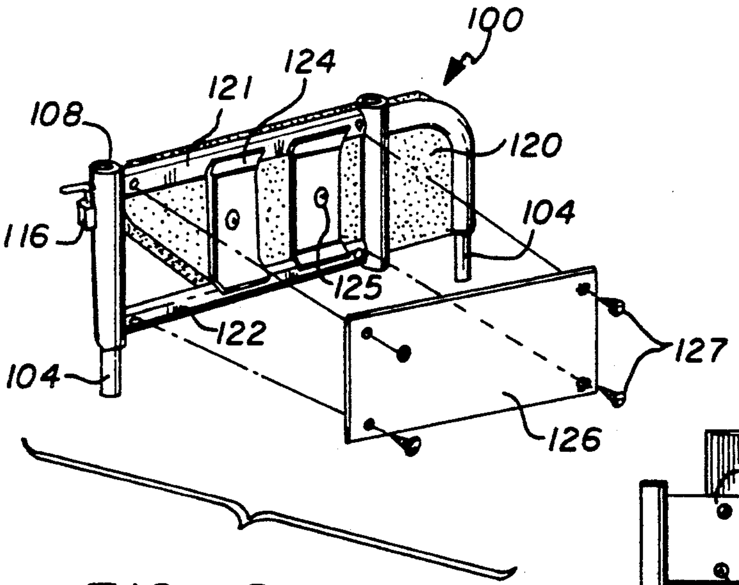
FIG. 8 is an exploded perspective view depicting installation of a side cushion unit onto an armrest of the seat module.

In accordance with one aspect of the invention, the side panel units 100 of the seat module 14 provide convenient structural support for side cushions 120 used to increase user comfort and/or to vary the effective width of the wheelchair seat. More particularly, as shown best in FIG. 8, the illustrative side panel unit 100 includes a pair of horizontally extending tubes 121 and 122. The open space between these tubes 121 and 122 accommodates reception of one or more bracket plates 124 having angled upper and lower edges adapted to engaged outboard sides of the tubes 121 and 122. Screw fasteners 125 or the like are fastened through the bracket plates 124 and into the side cushion 120 to clamp the side cushion 120 against the inboard side of the side panel unit 100. Appropriate selection of the side cushion thickness effectively alters the usable width of the wheelchair seat. Alternately, the side cushion 120 may be omitted, if desired. A closure plate 126 may be fastened by screws 127 or the like onto the outboard side of the side panel unit to conceal the bracket plates 124 from view.

Figure 9:
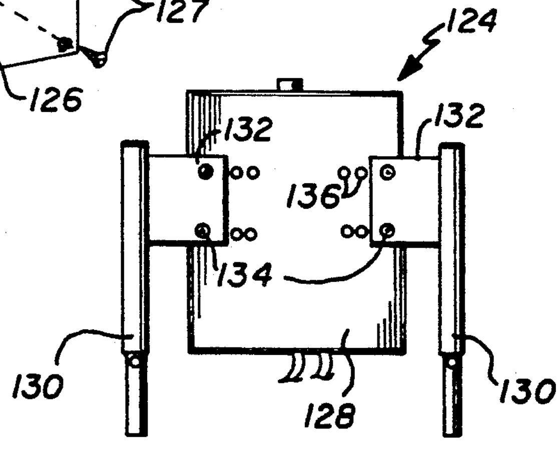
FIG. 9 is an enlarged rear elevational view of a control module for the power drive wheelchair, taken generally on the line 9—9 of FIG. 2.

The controller module 24 is adapted for convenient mounting onto the base module 12 at a position behind the seat module 14, and for quick and easy removal when chair disassembly is desired. More particularly, the controller module 24 comprises a generally rectangular housing 128 having appropriate electronic and/or solid state components encased therein. This housing 128 is mounted, as viewed in FIGS. 2 and 9, onto a pair of frame tubes 130 having short brackets 132 projecting therefrom in inboard directions. These brackets 132 are adapted in turn for secure attachment to the module container 128 by means of appropriate screw fasteners 134 or the like. Importantly, these fasteners 134 can be fitted into the housing 128 in selected threaded housing ports 136 to permit variation in frame tube lateral spacing according to the width geometry of the base frame. The lower ends of the frame tubes 130 are shaped to seat into the upper ends of the rear support posts 36 of the base frame, and spring-loaded latch pins 138 similar to the latch pins 116 releasably lock the frame tubes in the desired elevational position. Conveniently, to accommodate variations in the wheelchair center of gravity and the fore-aft geometry of the seat module 14, the controller module 24 can be mounted onto the base frame with the housing 128 in front of or behind the frame tubes 130.

The battery module 20 is also designed for rapid mounting onto and removal from the base module 12. As shown best in FIGS. 2 and 11–15, the battery module 20 comprises a relatively shallow tray 140 having a size and shape to fit into the base module 12 at a position below the seat module 14. The battery tray 140 provides a relatively simple support structure for the pair of battery containers 22 typically such as lightweight cases of molded plastic or the like. The storage batteries 142 (FIG. 11), such as twelve volt batteries, are protectively encased within these containers yet adapted for rapid plug-in connection to the controller module 24 by means of cables 144 or the like, when the wheelchair is in the assembled state. Carrying straps 146 are conveniently wrapped about the battery containers 22 for easy manual carrying of the batteries when required, and further to maintain the containers in a normally closed condition.

The battery module 20, includes a plurality of cam rollers projecting outwardly from opposite sides thereof at positions for rolling guided engagement with a pair of inclined cam ramps 150 mounted on the side frames 28 of the base module 12. More specifically, as shown clearly in FIGS. 2 and 11, a forward end of the battery tray 140 supports a transversely extending cam spindle 147 which carries a pair of cam rollers 148 at opposite outboard ends thereof. Similarly, at the rear end of the tray 140, a second or rear cam spindle 149 supports a pair of cam rollers 151 at the opposite ends thereof. The rear cam spindle 149 extends through the rear cam rollers 151 to define short outboard ends at opposite sides of the battery tray. Importantly, the forward cam rollers 148 are elevationally positioned above the rear cam rollers 151 so that the cam ramps 150 will normally support the battery tray 140 in a horizontal orientation, as will be described.

The cam ramps 150 are shown in detail in FIGS. 4 and 12–15 and extend upwardly and forwardly at the inboard margins of the side frames 28 and at an inclination angle which cooperates with the positions of the cam rollers 148 and 151 to support the tray 140 in a normal horizontal orientation. The upper or forward ends of the cam ramps 150 are associated with relatively small and rearwardly open keeper plates 152 (FIGS. 13 and 14) positioned to capture the cam rollers 148 and thereby to prevent said rollers 148 from lifting off the associated ramps 150. Similarly, the lower or rearward ends of the ramps 150 include hook-shaped forwardly open keeper plates 154 to capture the outboard ends of the rear cam spindle 149 to prevent cam roller lift-off from the ramps. Lock blocks 155 (FIG. 12) are pivotally supported on the side frames 28 and movable to rearwardly projecting positions (FIG. 13) to positively lock the rear spindle 149 within the keeper plates 154, thereby positively locking the battery module into the cam ramps 150.

In the use, the battery module 20 is removed quickly and easily from the base module 12 by flipping the lock blocks 155 to forwardly extending positions, as viewed in FIG. 12. In this unlocked position, the tray 140 and the batteries supported thereon can be disengaged from the base module by pushing the battery module 20 forwardly and upwardly a short distance along the cam ramps 150 and then lifting the rear spindle 149 a short distance to clear the keeper plates 154. The battery module 20 is then allowed to slide rearwardly along the cam ramps 150 to a position resting directly on the floor at the location behind the base module. That is, the ramps 150 are configured to allow the tray 140 to slide smoothly and directly to the floor without lifting, except to clear the keeper plates 154, to a position resting directly on the floor. The forward cam rollers 148 are disposed inboard relative to the rear keeper plates 154 to permit smooth uninterrupted sliding motion. On the floor, the tray 140 can be lifted easily by means of handles 156 and 158. The rearward handle 158 of course, is easily grasped to lift and release the rear spindle 149 from the keeper plates 154. Battery module reinstallation is achieved in a reverse manner by pushing the forward cam rollers 148 upwardly along the cam ramps 150 and then lifting the rear cam roller 151 sufficiently for engagement with the keeper plates 154 prior to returning the lock blocks 155 to the locked position.

The module power drive wheelchair 10 of the present invention thus assembles and disassembles in relation to a small number of compact modular components. Each modular component is designed with a size and weight for easy lifting and handling as may be required, for example, to place the components into an automotive vehicle of virtually any size for transport. When a destination is reached, the components can be reassembled with speed and ease to provide the desired power drive wheelchair operation. Moreover, the wheelchair 10 is uniquely adapted for use by children and the like, since key components of the chair are designed for size adjustment to meet periodic revisions in patient size requirements.

A variety of modifications and improvements to the improved power drive wheelchair of the present invention will be apparent to those skilled in the art. Accordingly, no limitation on the invention is intended by way of the foregoing description of accompanying drawings, except as set forth in the appended claims.

What is claimed is:

1. A modular power drive wheelchair comprising:

a base module defining a pair of side frame members disposed generally at opposite sides of the wheelchair and extending generally in a fore-aft direction, said base module further including a pair of support bushing members mounted generally at one of forward and rearward ends of respective ones of said pair of side frame members;

a seat module having a wheelchair seat, said seat module including a pair of generally U-shaped anchor feet brackets mounted generally at opposite sides along one of forward and rearward ends of said seat module and opening in laterally outboard directions, said pair of U-shaped anchor feet brackets being positioned and sized for receiving therein respective ones of said pair of side frame members to prevent vertical movement of said seat module relative to said side frame members, said seat module further including a pair of generally U-shaped clevis members mounted generally at opposite sides along the other of said forward and rearward ends of said seat module and opening in a forwardly direction, said pair of U-shaped clevis members being positioned and sized for receiving therein respective ones of said pair of support bushing members when said side frame members are received within said anchor feet brackets; and quick release means for selectively locking said clevis members and said support bushing members in engagement with each other.

2. The module power drive wheelchair of claim 1 wherein said support bushing members are positioned generally adjacent the forward end of said base module, and further wherein said clevis members are positioned generally adjacent the forward end of said seat module, said anchor feet brackets being positioned generally adjacent the rearward end of said seat module.

3. The modular power drive wheelchair of claim 1 wherein said base module further includes a plurality of wheels to support the wheelchair for rolling movement, and drive motor means for drivingly rotating at least one of said wheels.

4. The modular power drive wheelchair of claim 1 wherein said base module further includes adjustable width support members connected between said pair of side frame members.

5. The modular power drive wheelchair of claim 4 wherein said seat module further includes means for adjusting the width of said seat module.

6. The modular power drive wheelchair of claim 1 further including means for adjustably mounting said anchor feet brackets on said seat module.

* * * * *